(12) United States Patent
Bejerasco et al.

(10) Patent No.: US 9,479,505 B2
(45) Date of Patent: Oct. 25, 2016

(54) CONTROLLING ACCESS TO A WEBSITE

(71) Applicant: F-Secure Corporation, Helsinki (FI)

(72) Inventors: Christine Bejerasco, Helsinki (FI); Karmina Aquino, Helsinki (FI)

(73) Assignee: F-Secure Corporation, Helsinki (FI)

( * ) Notice: Subject to any disclaimer, the term of this patent is extended or adjusted under 35 U.S.C. 154(b) by 254 days.

(21) Appl. No.: 14/247,486

(22) Filed: Apr. 8, 2014

(65) Prior Publication Data

US 2014/0304774 A1 Oct. 9, 2014

(30) Foreign Application Priority Data

Apr. 8, 2013 (GB) .................................. 1306310.2

(51) Int. Cl.
*G06F 7/04* (2006.01)
*G06F 15/16* (2006.01)
*G06F 17/30* (2006.01)
*H04L 29/06* (2006.01)
*H04L 29/08* (2006.01)

(52) U.S. Cl.
CPC .......... *H04L 63/10* (2013.01); *G06F 17/3089* (2013.01); *G06F 17/30598* (2013.01); *G06F 2221/2119* (2013.01); *H04L 67/02* (2013.01)

(58) Field of Classification Search
CPC .. G06F 21/00; G06F 21/128; G06F 21/2119; H04L 63/10; H04L 63/12; H04L 63/14; H04L 63/1408; H04L 63/1441; H04L 63/306
See application file for complete search history.

(56) References Cited

U.S. PATENT DOCUMENTS

| | | | |
|---|---|---|---|
| 7,792,846 B1 | 9/2010 | Raffill et al. | ........... 707/754 |
| 2012/0158626 A1* | 6/2012 | Zhu | .......... H04L 63/1408 706/13 |
| 2012/0191630 A1* | 7/2012 | Breckenridge | ...... G06N 99/005 706/12 |
| 2013/0066814 A1 | 3/2013 | Bosch et al. | ........... 706/12 |
| 2014/0075299 A1* | 3/2014 | Ain | .......... G06F 17/2745 715/255 |

FOREIGN PATENT DOCUMENTS

| | | |
|---|---|---|
| GB | 2 442 284 A | 4/2008 |
| GB | 2442284 A * | 4/2008 |

* cited by examiner

*Primary Examiner* — Daniel Potratz
(74) *Attorney, Agent, or Firm* — Harrington & Smith

(57) ABSTRACT

Methods and apparatus for website access control. The methods and apparatus include, at a user terminal: accessing a plurality of training websites over a network; training the user terminal by classifying the training websites in a content category based on a user input, extracting one or more features indicative of the content category from the training websites and determining a classifier based on the extracted features; classifying further requested websites using the determined classifier; and controlling access to the further requested websites based on the classification of the websites.

17 Claims, 7 Drawing Sheets

CONTROLLING ACCESS TO A WEBSITE

TECHNICAL FIELD

The invention relates to methods and apparatus for controlling access to one or more websites. Specifically, the invention relates to, but is not limited to, controlling access to one or more websites based on features extracted from websites classified in a given content category.

BACKGROUND

Network security and access control systems aim to restrict a user terminal from accessing certain web content over a network, such as the Internet. Systems implementing network security and access control can include, for example, anti-virus software, parental control software, employee productivity software, and Internet security software. Typically, such systems are generic and implement predefined algorithms to control access to web content.

However, such generic systems are limited in the functionality they provide and may not serve all users in precisely the manner that they would like.

It is possible to use crowd-sourcing to provide relevant information that may be used by network security systems. A crowd of people may classify web content and provide this information to network security systems. However, one major disadvantage of this is that it is highly dependent on the continuous engagement of the people (the crowd) classifying content. Usually, when the novelty fades, the excitement dies out and people are no longer classifying unless they have a stake in it.

SUMMARY

According to an aspect of the invention, there is provided a method of website access control. The method comprises, at a user terminal, accessing a plurality of training websites over a network. The method comprises training the user terminal by classifying the training websites in a content category based on a user input. Training the user terminal also comprises extracting one or more features indicative of the content category from the training websites and determining a classifier for classifying websites in the content category based on the extracted features. The method also comprises classifying further requested websites using the determined classifier and controlling access to the further requested websites based on the classification of the websites.

Optionally, the classifier is determined if the number of training websites accessed reaches a threshold value.

Optionally, controlling access to the further requested websites comprises denying access if the classifier classifies the website in the content category.

Optionally, controlling access to the further requested websites comprises allowing access if the classifier classifies the website in the content category.

Optionally, the method further comprises verifying the determined classifier by accessing a plurality of verification websites and classifying the verification websites using the classifier, and if the verification websites are classified in the content category, prompting a user to verify the classification of the verification websites.

Optionally, the method further comprises, if the user does not verify the classification of the verification websites, extracting features indicative of the content category from the verification website and updating the classifier based on the extracted features.

Optionally, the classifier comprises an initial classifier and a control classifier, the initial classifier being determined based on the features extracted from the training websites, and the control classifier being determined based on the features extracted from the verification websites, wherein updating the classifier comprises determining the control classifier based on the features extracted from the verification websites.

Optionally, the verification websites are classified using the initial classifier and, if the initial classifier classifies the verification website in the content category, the classification is checked using the control classifier, the user being prompted if the initial classifier and the control classifier classify the verification website in the content category Optionally, the method further comprises, if the user verifies the classification, incrementing a correct counter and, if the user does not verify the classification, incrementing an incorrect counter.

Optionally, the method further comprises, verifying the classifier if the ratio of correct classifications to incorrect classifications reaches a threshold value.

Optionally, the method further comprises, repeating the verification at a predetermined time.

Optionally, the method further comprises, repeating the verification based on a user input.

Optionally, controlling access to a website comprises: classifying the website using the initial classifier; if the initial classifier classifies the further website in the content category, checking the classification using the control classifier; and controlling access to the website if the initial classifier and the control classifier classify the website in the content category.

Optionally, the features of the training and/or verification websites may be extracted from one or more of: the HTML tag structure of the website; the text of the website; links to other websites; links from Iframes; the title of the website; and the HTTP headers of the website.

Optionally, the features extracted from the training and/or verification websites include one or more of: a keyword on a page content of the website; a keyword on a page title of the website; keywords on a URL of the website; one or more small, medium and/or large images on the website; a content category of a hyperlink on the website; a colour of a background page in RGB; and a number and size of flash objects on the website.

Optionally, the method further comprises a user creating a new content category, wherein the training websites are classified in the new content category.

Optionally, the method further comprises updating a list of existing content categories to include the new content category.

Optionally, determining the classifier comprises selecting features present in a number of the plurality of training websites greater than or equal to a valid feature threshold and including the selected features in the classifier.

Optionally, determining the classifier comprises discarding features that are present in a number of the plurality of training websites less than or equal to an invalid feature threshold.

Optionally, training the user terminal comprises classifying the training websites in one of a plurality of content categories.

Optionally, training the user terminal comprises determining a plurality of classifiers, each classifier corresponding to one of the plurality of content categories.

Optionally, further requested websites are classified using one or more of the plurality of determined classifiers.

Optionally, controlling access to the further requested websites comprises controlling access based on a rule associated with the content category into which the further requested website is classified.

According to another aspect of the invention, there is provided a user terminal for controlling access to a website. The user terminal comprises a communication unit configured to access a plurality of training websites over the network. The user terminal comprises a classification unit configured to train the user terminal by classifying the training websites in a content category based on a user input. The user terminal comprises a feature extraction unit configured to extract from the training websites one or more features indicative of the content category. The user terminal comprises a classifier determining unit configured to determine a classifier for classifying websites in the content category based on the extracted features. The user terminal comprises an access control unit configured to classify further requested websites using the classifier and to control access to the further requested websites based on a classification of the websites.

According to another aspect of the invention, there is provided a method of website access control, comprising: accessing, by a communications unit of a user terminal, a plurality of training websites over a network; classifying, by a classification unit of the user terminal, the training websites in a content category based on a user input; extracting, by a feature extraction unit, one or more features indicative of the content category from the training websites; determining, by a classifier determining unit, a classifier for classifying websites in the content category based on the extracted features; verifying, by a verification unit, the determined classifier by accessing, by the communications unit of the user terminal, a plurality of verification websites and classifying the verification websites using the classifier and if the verification websites are classified in the content category, prompting a user to verify the classification of the verification websites; and classifying, by an access control unit, further requested websites using the verified determined classifier and controlling access to the further requested websites based on the classification of the websites.

Optionally, controlling access to the further requested websites comprises denying access if the classifier classifies the website in the content category.

Optionally, the method further comprises, if the user does not verify the classification of the verification websites, extracting features indicative of the content category from the verification website and updating the classifier based on the extracted features.

Optionally, the classifier comprises an initial classifier and a control classifier, the initial classifier being determined based on the features extracted from the training websites, and the control classifier being determined based on the features extracted from the verification websites, wherein updating the classifier comprises determining the control classifier based on the features extracted from the verification websites.

Optionally, the verification websites are classified using the initial classifier and, if the initial classifier classifies the verification website in the content category, the classification is checked using the control classifier, the user being prompted if the initial classifier and the control classifier classify the verification website in the content category.

Optionally, the method further comprises, if the user verifies the classification, incrementing a correct counter and, if the user does not verify the classification, incrementing an incorrect counter.

Optionally, the method further comprises verifying the classifier if the ratio of correct classifications to incorrect classifications reaches a threshold value.

Optionally, the method further comprises at least one of: repeating the verification at a predetermined time; and repeating the verification based on a user input.

Optionally, controlling access to a website comprises: classifying the website using the initial classifier; if the initial classifier classifies the further website in the content category, checking the classification using the control classifier; and controlling access to the website if the initial classifier and the control classifier classify the website in the content category.

Optionally, determining the classifier comprises selecting features present in a number of the plurality of training websites greater than or equal to a valid feature threshold and including the selected features in the classifier.

Optionally, the feature extraction unit, the classifier determining unit and the verification unit form part of the user terminal, the method further comprising transmitting the verified determined classifier to a server and storing the classifier and a corresponding set of training websites in a memory of the server.

Optionally, the feature extraction unit, the classifier determining unit and the verification unit form part of a server, the method further comprising storing the classifier and a corresponding set of training websites in a memory of the server.

Optionally, a plurality of classifiers and a plurality of associated sets of training websites are stored in the memory of the server, the method further comprising: comparing, by a classifier comparison unit, the plurality of classifiers to determine whether the content categories of each overlap; if the content categories of the plurality of classifiers overlap, extracting, by the feature extraction unit, a plurality of training websites from each of the sets of training websites corresponding to the overlapping classifiers; merging, by the classifier determining unit, the extracted plurality of training websites into a global set of training websites; and determining, by the classifier determining unit, a global classifier based on the global set of training websites.

Optionally, the method further comprises transmitting, by the communications unit a notification generated by the classifier determining unit recommending the global classifier to one or more user terminals using one or more of the plurality of classifiers.

Optionally, the access control unit forms part of the server, the method further comprising: comparing, by a classifier comparison unit, a further website classified based on the determined classifier with a plurality of training websites corresponding to an undetermined classifier; if the further website matches one of the plurality of training websites for the undetermined classifier, retrieving, by the classifier comparison unit, one or more training websites corresponding to the determined classifier; merging, by the classifier determining unit, the retrieved one or more training websites corresponding to the determined classifier and the training websites corresponding to the undetermined classifier into a global set of training websites; and determining, by the classifier determining unit, a global classifier based on the global set of training websites.

Optionally, the access control unit forms part of the server, the method further comprising, at the server: receiving, by the communications unit, data from a further user terminal relating to one or more training websites corresponding to an undetermined classifier; classifying, by the access control unit, the one or more training websites corresponding to the undetermined classifier based on the determined classifier; if the one or more training websites corresponding to the undetermined classifier is classified in the content category of the determined classifier, transmitting, by the communications unit a notification generated by the classifier determining unit recommending the global classifier to the further user terminal.

According to another aspect of the invention, there is provided a non-transitory computer readable medium comprising computer readable code configured to carry out any of the methods described above According to another aspect of the invention, there is provided a user terminal for controlling access to a website, the user terminal comprising: a communication unit configured to access a plurality of training websites over the network; a classification unit configured to train the user terminal by classifying the training websites in a content category based on a user input; a feature extraction unit configured to extract from the training websites one or more features indicative of the content category; a classifier determining unit configured to determine a classifier for classifying websites in the content category based on the extracted features; wherein the communication unit is further configured to access a plurality of verification websites and a verification unit is configured to verify the determined classifier by classifying the verification websites using the classifier and if the verification websites are classified in the content category, prompting a user to verify the classification of the verification websites; and an access control unit configured to classify further requested websites using the verified determined classifier and to control access to the further requested websites based on a classification of the websites.

According to another aspect of the invention, there is provided a server for controlling access to a website, the server comprising: a communication unit configured to receive data relating to a plurality of training websites over the network; a feature extraction unit configured to extract from the training websites one or more features indicative of the content category; a classifier determining unit configured to determine a classifier for classifying websites in the content category based on the extracted features; wherein the communication unit is further configured to receive data relating to a plurality of verification websites and a verification unit is configured to verify the determined classifier by classifying the verification websites using the classifier and if the verification websites are classified in the content category, prompting a user of a user equipment to verify the classification of the verification websites; and an access control unit configured to classify further requested websites using the verified determined classifier and to control access to the further requested websites based on a classification of the websites.

BRIEF DESCRIPTION OF THE DRAWINGS

Exemplary embodiments of the invention are described herein with reference to the accompanying drawings, in which.

DESCRIPTION

The inventors have appreciated that users may require greater flexibility and control over the categories of website accessible via their user terminal. Generally, disclosed herein are methods and apparatus that permit user defined website access control.

As used herein, the term "website" should be construed broadly to encompass any entity, e.g. a file, document or web page, that can be identified, named, addressed or handled, in any way whatsoever, in the Internet or in any networked information system. For example, a website may be a target of a Uniform Resource Locator (URL).

The methods and apparatus disclosed herein are, to some degree, dependent on the level of engagement of a user. Broadly speaking, the methods and apparatus disclose a process of training a network security function of a user terminal to provide customised website access control.

Figure 1:
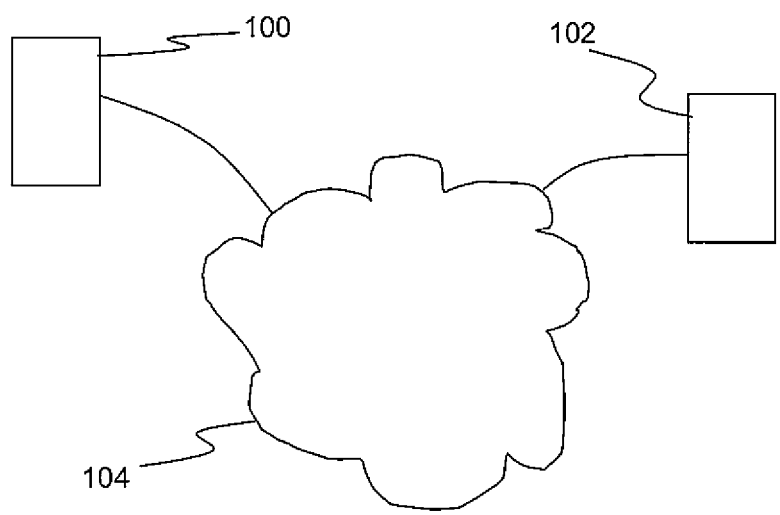
FIG. 1 is a schematic diagram of a network.

Generally, the methods and apparatus disclosed are for controlling access to one or more websites from a user terminal in a network. FIG. 1 shows a user terminal 100 and a server 102 in electrical communication with a network 104. The user terminal 100 may be any computing device that is connected to the network 104. For example, the user terminal may be a personal computer, a PDA, smart phone, tablet computer, lap top computer.

The network 104 may be any type of computer network, for example, a LAN, WAN, an Internet, an intranet or the Internet. Typically, a plurality of servers 102 and/or user terminals 100 may be in electrical communication with each other via the network 104. A user operates the user terminal 100 to access websites and web content located at one or more servers 102 via the network 104. In addition, the server 102 may comprise memory storing data for controlling access to a website from the user terminal 100 and one or more processors for processing data for controlling access to a website from the user terminal 100.

The methods and apparatus disclosed herein relate to accessing a training website over the network 104 and attributing the training website to a content category. This compiles a set of training websites in a given content category. Features of the set of training websites are extracted and may be stored at the user terminal 100 and/or the server 102. When a sufficient number of training websites have been attributed to a content category, the extracted features are used to control access to one or more websites. The one or more websites to which access is controlled may have the same or similar features to those extracted from the set.

As used herein, the terms "training website" and "verification website" are used to aid the description of the invention. The terms do not imply any limitation on the types of website. A training website is one that may be used by a network security system to train the system to recognise a particular type of website in a given content category. A verification website is one that may be used by a network security system to verify its website classification process.

Exemplary content categories may include malware, pornography or any other type of content. In exemplary methods and apparatus, a user may define personalised categories, as set out below.

Figure 2A:
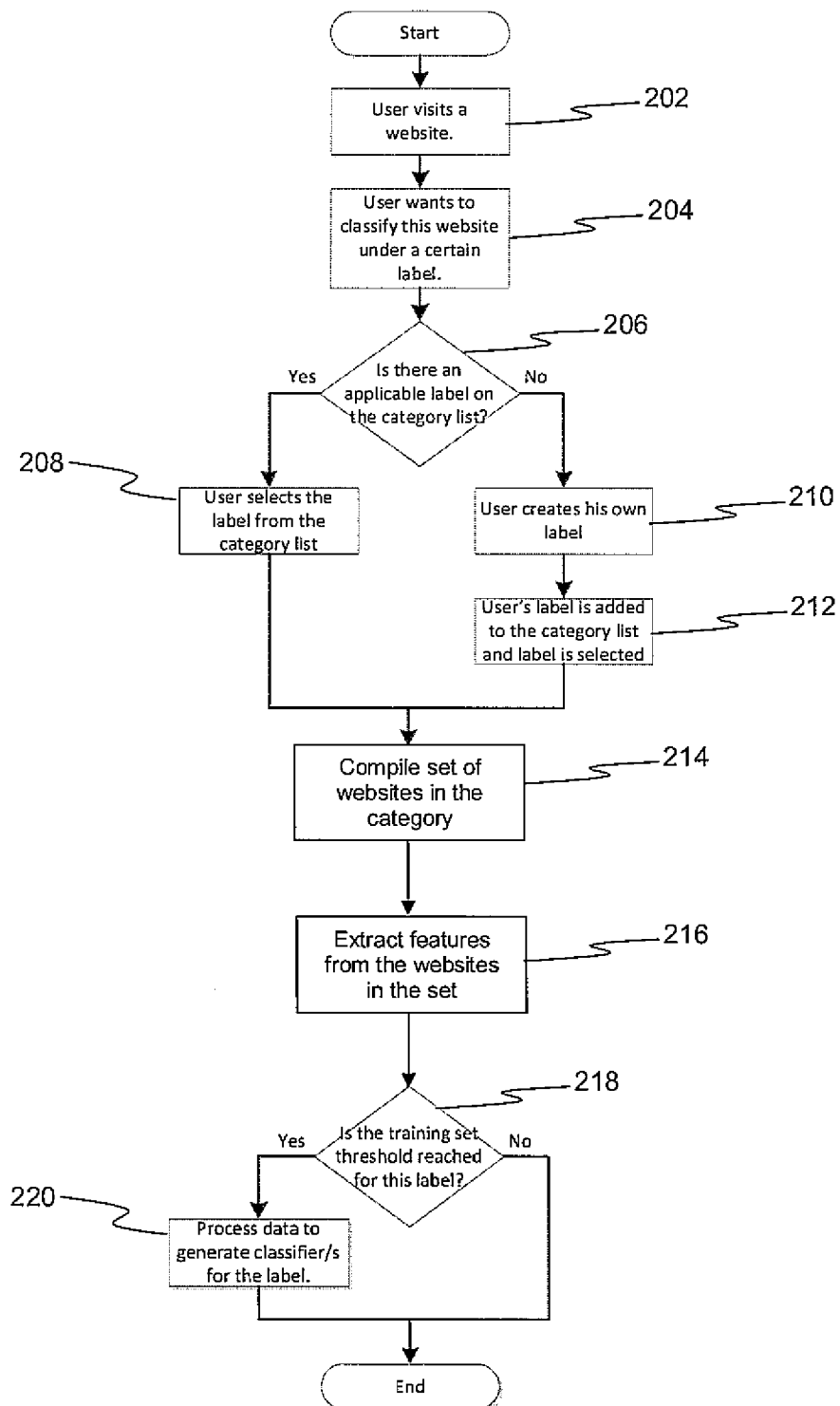
FIGS. 2*a-c* are flow diagrams.
Figure 2B:
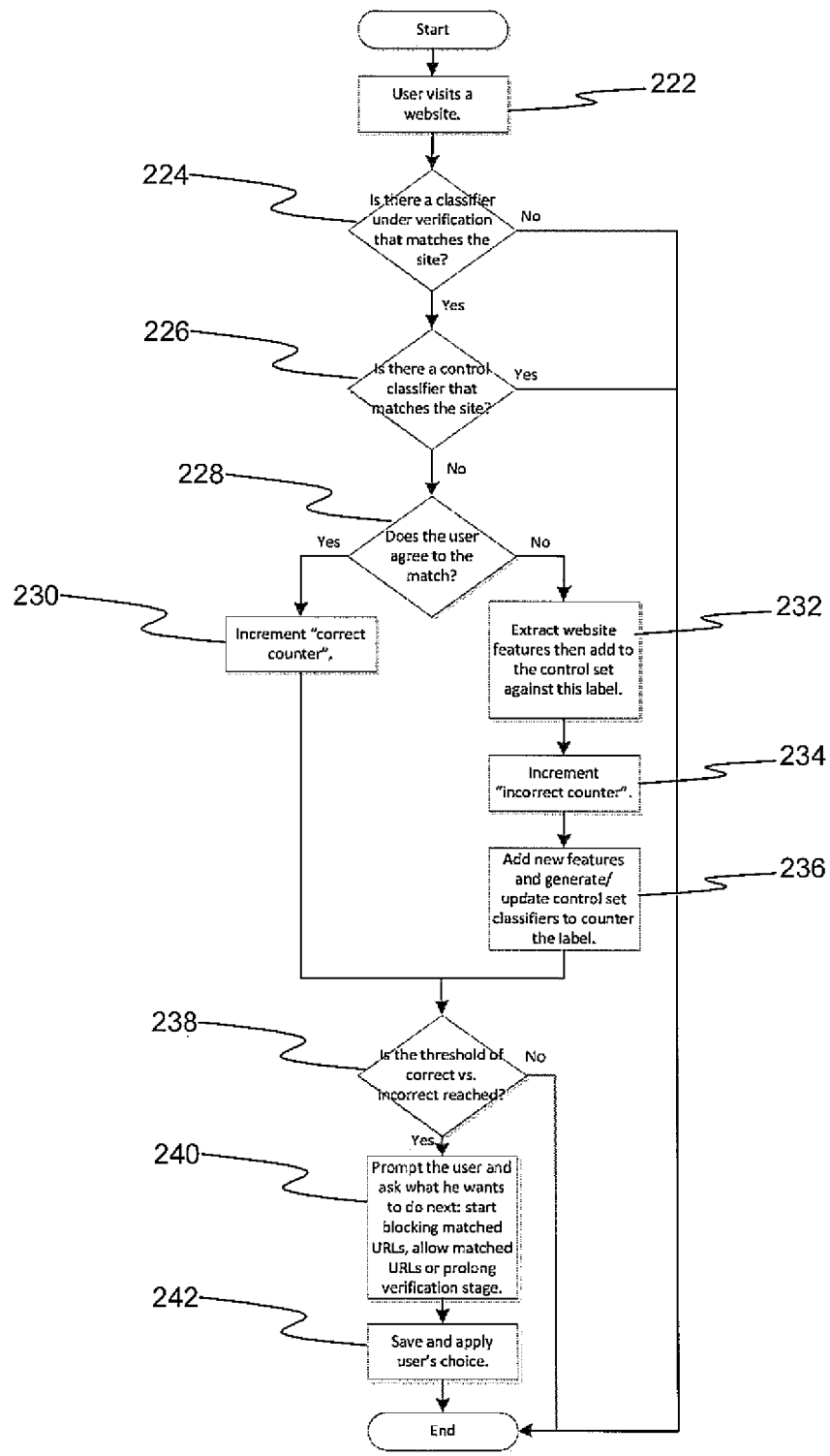
Figure 2C:
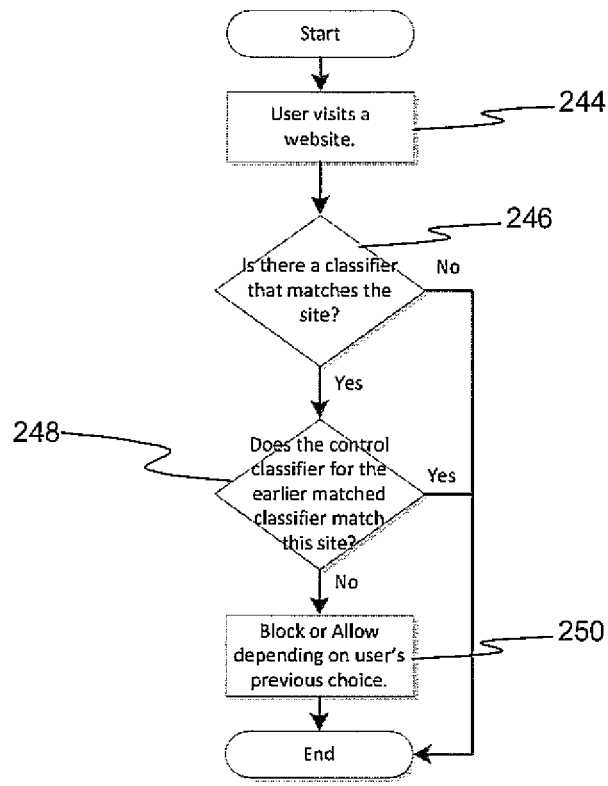

FIGS. 2a-2c may be concatenated to show a flow diagram of a method of controlling access to one or more websites. FIG. 2a shows a training phase comprising creating a set of training websites that have been classified by a user and determining a classifier based on the training websites. FIG. 2b shows a verification phase comprising verification of the classifier by accessing verification websites and seeking user approval of their classification. FIG. 2c shows a usage phase comprising controlling access to one or more websites based on the classifier. However, it is noted that each of the processes in FIGS. 2a-2c are only exemplary and other methods for the training phase, the verification phase and the usage phase may be implemented. In particular, the training phase need not be used in conjunction with the processes disclosed in FIGS. 2b and 2c. In addition, the verification phase is optional.

In addition, one or more steps of the methods shown in FIGS. 2a-2c may be undertaken by the user terminal 100 and/or the server 102 as set out in more detail below.

Figure 3:
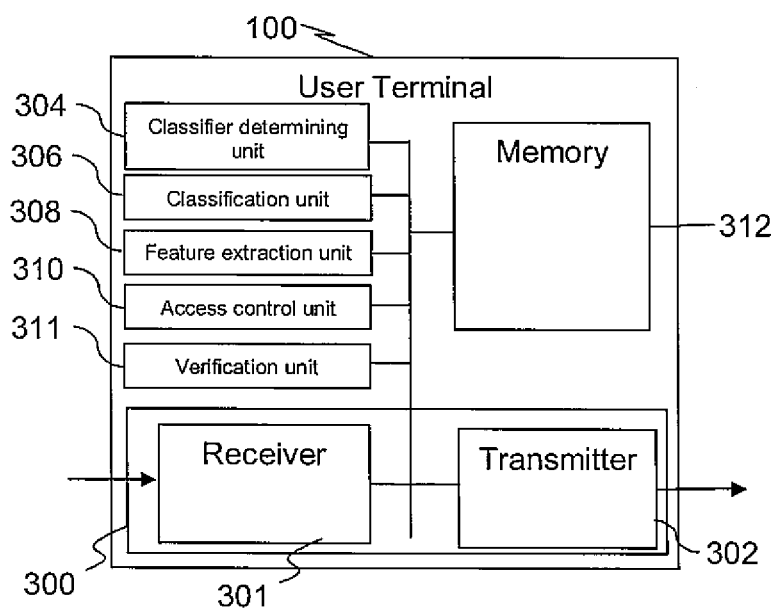
FIG. 3 is a schematic representation of a user terminal.

Referring to FIGS. 2a and 3, in a training phase, a user accesses 202, at the user terminal 100, a training website using a communication unit 300. The user identifies the website as belonging to a certain category of web content to which the user wishes access to be allowed or denied. The user determines 204 that he wishes to attribute the website to a content category to which access is to be controlled. The user may then apply a label to the website, thereby classifying the website to a content category. The label is an identifier for the content category and is applied to the website by a classification unit 304. For example, if the user would like to classify "white supremacy" sites and then there is not an existing label for it, the user can add the label "white supremacy" and when the training sets are compiled, those sets will be targeted at white supremacy sites. In use, the user will be informed that a "white supremacy" site is matched.

If there is an existing label on the product, e.g. "Pornography", then the user could use that existing label too. This label identifies the type of content that is being matched and, for the training sets, this will serve as the group name for all the websites and the features extracted from them. If a label required by the user already exists and the user has not attempted to train the classifiers, the label only contains the list of classifiers it needs to categorize the website. It does not contain websites or website features. If a user would like to train a classifier, the websites along with the website features will be put under the chosen label. Once the classifiers are properly trained, the websites and the features associated to the training sets will be removed from the system and disassociated with the label, leaving only the classifiers being associated to the label.

The user may use a predefined content category or may create a customised content category. The user may opt to create a customised category if, for example, none of the predefined categories fits the user's requirements. The predefined categories may be updated to include customised categories newly created by the user.

At step 206, the user determines whether a content category is already defined in which the website may be classified. If a content category is already defined, the user classifies 208 the website to that category. This may be done by selecting a label corresponding to the content category and applying that label to the training website. If no suitable content category is available, the user defines 210 a customised content category. This may be done by creating a new label that corresponds to the customised content category. The customised content category may be added 212 to the list of content categories that has been defined and the website is attributed to that category. The user then classifies the training website in the customised content category, which may be done by applying the new label corresponding to the customised content category to the training website.

Classification of the training website is used to compile 214 a set of training websites relating to the selected (or created) content category. This may be carried out by storing a URL identifying the website in a memory of the user terminal 100.

After the training website has been classified in a content category by the user, one or more features of the website, which are needed to determine a classifier (discussed below), are extracted 216 by a feature extraction unit 306 and stored at a memory 312 of the user terminal 100. The memory may be the local disk of the user terminal 100. The extracted features are indicative of the content category. The features of the training website can be extracted from any data relating to the website and may comprise features that, at that point in time, are deemed useful. Below are examples of features of a training website from where features can be extracted. It is noted that the list provided below is not exhaustive and specific features are discussed below in an exemplary scenario.

HTML tag structure
Page text
Links to other websites
Links from Iframes
Page title
HTTP Headers It is then determined 218 whether the number of training websites in the set of training websites relating to the category has reached a predetermined threshold value. The threshold value may be any number of websites, for example, in the range from 100 to 500 websites, from 200 to 300 websites or, specifically may be 250 websites. If the threshold value has not been reached, the set of training websites relating to the content category is not considered large enough to produce useful data for controlling access to websites. In that case, no action is taken to control access to websites based on the extracted features and the process of FIG. 2a is allowed to begin again until the threshold is reached. If the threshold value is reached, the extracted features are processed 220 by a classifier determining unit 304 to determine one or more classifiers for the content category. The classifier may be used to control access to one or more websites in the usage phase. In a general context, a classifier is a digest of all the characteristics extracted from a group of training websites (the training sets). Based on those discovered characteristics, a classifier looks for similar characteristics in unclassified websites and, if they match, then the unclassified website is determined to belong the category that the classifier is targeting.

Processing of the features of the training websites in the set may be undertaken, for example, using a data mining, machine learning or content classification methodology. Specific examples of processing to determine a classifier are provided below. The determined classifiers may be able to identify similar websites to those in the set and this may be used to control access to those similar websites in the usage phase. Specifically, the determined classifiers may identify websites with features the same as or similar to the features of the training websites in the set Each time the user accesses a training website that should be classified in a content category, the user applies the corresponding label and thereby adds the training website to a set related to the content category. The user may come across further websites to be attributed to a given content during normal browsing or may specifically look for similar websites in order to train the user terminal 100. The user continues to add URLs of training websites to the set of training websites associate with a particular label and therefore related to a given web content category.

When the number of training websites in the set reaches a predefined threshold value, the training websites may be used to control access to one or more websites. For example, when the threshold is reached, the set of training websites classified in one content category may become a training set for this particular content category. Then features previously extracted from the set of training websites are processed to determine one or more classifiers, based on which access to one or more websites may be controlled.

In exemplary methods and apparatus, all of the steps shown in FIG. 2a may be undertaken in a user terminal 100. In other exemplary methods and apparatus, one or more of the steps of FIG. 2a may be undertaken in a server 102.

Figure 4:
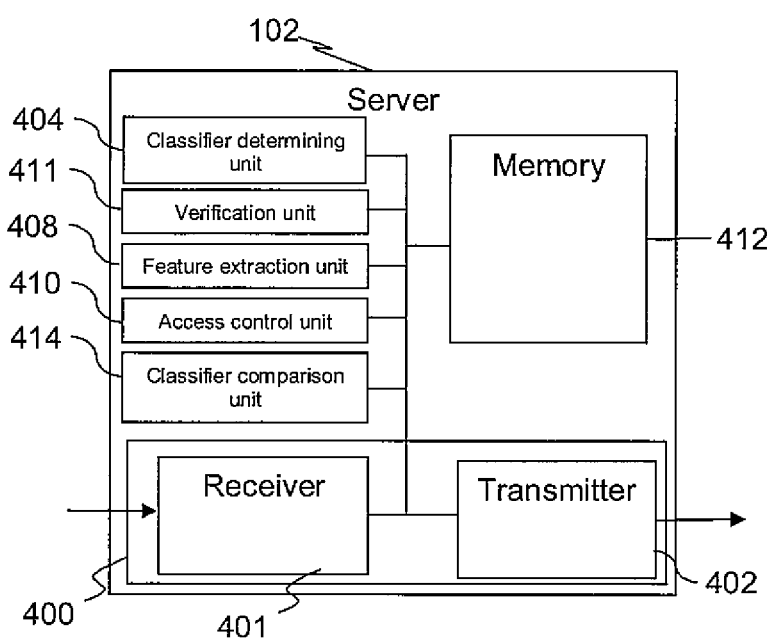
FIG. 4 is a schematic representation of a server.

For example, referring to FIGS. 2a and 4, the transmitter 302 of the user terminal 100 may, after classification of a website at steps 204-212, transmit data relating to the website and data relating to the content category to the server 102. The server 102 then stores and compiles 214 in memory 412 the data relating to the training websites. A feature extraction unit 408 of the server 102 may extract 216 features from the training website and store those in the memory 412. If the threshold value is reached 218 a classifier determining unit 404 determines a classifier for the content category as set out above.

FIG. 2b shows a verification phase, which may be used to verify whether the determined classifier is able to accurately classify websites in the content category. Generally, in the verification phase, verification websites are accessed from the user terminal 100 and, if they match the criteria specified by the classifier, they are indicated to the user for verification and approval of the classification. The user then agrees or disagrees whether the indicated website should be included in the content category. A control set may be generated, from which can be generated a new classifier(s) that is able to identify close matches that should not be included in the content category. The classifier may therefore comprise two separate classifiers. The classifier determined based on features extracted from the training websites may be termed an initial classifier and the classifier determined from features extracted from verification websites may be termed the control classifier. This process of determining a control classifier allows the methods and apparatus disclosed to have increased accuracy.

Referring to FIGS. 2b and 3, a user visits 222 a verification website using the communication unit 300 of the user terminal 100 over the network 104. It is then determined 224 by a verification unit 311 whether an initial classifier that is undergoing verification matches the verification website. That is, the verification website is classified using the initial classifier determined in the training phase. If no classifier matches the website, the process ends and the user may be able to view the website without further controls being placed on access. The process may then pass to the usage stage of FIG. 2c, which is discussed below.

If an initial classifier does match the verification website it is determined 226 by the verification unit 311 whether a control classifier (e.g. a classifier from the control set) matches the website. If a control classifier does match the website, the process ends and the user may be able to view the website without further controls being placed on access and the process may then pass to the usage stage of FIG. 2c. It is noted that a control classifier is generated when a user does not agree that a website belongs to a content category, even though it has been identified as such by the initial classifier determined at step 220. This is explained in greater detail below. Therefore, a control classifier identifies websites that should not be included in a content category. Therefore, if a control classifier matches a verification website, it is an indication that the website should not be included in the content category and so access to the website is not controlled.

If a control classifier does not exist that matches the website, a prompt is delivered 228 to the user to ask whether he agrees that the website should be added to the content category. This step will occur the first time a user accesses a verification website in the verification phase, as no control classifier exists for that content category at that time. Indeed, this step will occur until such time as a user disagrees with the classification of the initial classifier, as that will prompt the generation of a control classifier.

If the user agrees with the classification of the initial classifier, a "correct" counter is incremented 230 in the memory 312 to indicate that the initial classifier(s) have correctly identified a verification website in the content category.

If the user does not agree, features of the verification website are extracted 232 by the feature extraction unit 308 in a similar way to that disclosed above. The extracted features may be stored by the verification unit 311 in the memory 312 as part of a control set related to the content category. The control set provides data that allows the generation of the control classifier(s) referred to above. An "incorrect" counter is incremented 234 in the memory 312 to indicate that the classifier(s) have incorrectly identified a verification website in a given content category. The extracted features are used by the verification unit 311 to generate or update 326 one or more control classifiers relating to the content category. The control classifiers are used to refine the classification of the initial classifier. This may be done on the next pass through the verification phase at step 226.

It is determined 238 by the verification unit 311 whether a predetermined ratio threshold of correct indications to incorrect indications has been reached. In exemplary methods and apparatus, the number of verification websites accessed must be statistically significant and the ratio threshold must have been met. For example, to be statistically significant, the number of verification websites accessed may be in the range from 20 to 100, in the range from 20 to 50 or, specifically, may be 30 or 60. Also, the ratio threshold may be in the range from 50% to 100%, in the range from 60% to 90% or, specifically, may be 80%. If the ratio threshold has not been reached then the process ends and the verification phase for the content category is continued. The user is allowed to continue browsing in the verification phase, as the quality of the classifications by the classifier is not yet sufficient. The next time the user accesses a verification website, the process may begin again at step 222.

If the ratio threshold has been reached, it is determined by the verification unit 311 that the classifier has been validated and that the quality of indications is sufficient to control access to websites in a usage phase. In this case, the method may proceed to a usage phase. Alternatively, the user may be prompted 240 to select what action he would like to perform next. The user may be prompted to select from one or more of: blocking websites identified as belonging to the content category; allowing access to websites identified as belonging to the content category; and continuing the verification phase. The user may be able to specify a new ratio threshold. For example, the user may instruct the terminal 100 to continue the verification stage until a certain percentage of the total indications are correct indications. Other user instructions may be received and undertaken by the user terminal 100.

Accordingly, the verification phase may continue until the predefined ratio threshold for correct vs. incorrect website indications is reached. When this happens, the user may be prompted on the current accuracy of the classifier and asked what he would like to do next.

In exemplary methods and apparatus, all of the steps shown in FIG. 2b may be undertaken in a user terminal 100. In other exemplary methods and apparatus, one or more of the steps of FIG. 2b may be undertaken in a server 102.

For example, referring to FIGS. 2b and 4, after visiting a verification website at step 222, the transmitter 302 of the user terminal 100 may transmit data relating to the website to the server 102. The verification unit 411 of the server 102 may then determine 224 whether an initial classifier under verification that matches the website. If there is an initial classifier matching the website, the verification unit 411 may determine 226 whether there is a corresponding control classifier for the website category.

If the user agrees with the classification by the initial classifier, a "correct" counter is incremented in the memory 412.

If the user does not agree, features of the verification website are extracted 232 by the feature extraction unit 408 of the server 102 in a similar way to that disclosed above. The extracted features may be stored by the verification unit 411 in the memory 412 as part of a control set related to the content category. The control set provides data that allows the generation of the control classifier(s) referred to above. An "incorrect" counter is incremented 234 in the memory 412 to indicate that the classifier(s) have incorrectly identified a verification website in a given content category. The extracted features are used by the verification unit 411 to generate or update 236 one or more control classifiers relating to the content category. The control classifiers are used to refine the classification of the initial classifier. This may be done on the next pass through the verification phase at step 226.

The verification unit 411 of the server 102 determines whether the threshold of correct to incorrect classifications has been reached, as set out above. If the threshold has been reached, then a prompt may be transmitted to the user terminal 100 to request an input from the user as discussed above. Dependent on the user input, the validated classifier may be stored in the memory 412 of the server 102.

After completion of the verification stage, a content category has associated with it a verified initial classifier and a control classifier combination. These may be collectively termed as a "classifier". The classifier is stored in the memory 312 of the user terminal 100 and/or the memory 412 of the server 102.

The initial classifier is determined at step 220 in the training phase based on training websites identified by the user as belonging to the content category. The initial classifier is used to indicate initially what websites might belong to the content category. The control classifier is determined at step 236 in the verification phase based on verification websites and identifies those websites that have been classified in the content category by the initial classifier, but which do not actually belong to the content category. The initial classifier can be considered to provide a coarse identification and the control classifier can be considered to provide finer classification. The initial and control classifiers may be stored in a memory of the user terminal 100.

After the initial and control classifiers have been validated, the process may enter the usage stage, as shown in FIG. 2c. In this scenario, the initial classifier built based on the user's training and verification together with the control classifier which is taken from the verification stage, is put into use.

The user accesses 244 a website and the access control unit 310 of the user terminal determines 246 whether an initial classifier matches the website. That is, the website is classified based on an initial classifier. If the verification stage of FIG. 2b has been undertaken, it may be determined whether a validated initial classifier matches the website. If no classifier matches the website, or if the initial classification determines that the website is not part of the content category, the process ends and the user is able to access the website without any further control over access.

If an initial classifier does exist that matches the website, the access control unit 310 may determine 248 whether a control classifier associated with the same content category as the initial classifier matches the website. That is, if the initial classifier classifies the website in the content category, the access control unit 310 checks the classification against the control classifier. This step is dependent on a verification stage that determines one or more control classifiers. If a control classifier is stored at the terminal 100 that matches the website (i.e. if the initial classification of the website is not verified by the control classifier), the process ends and the access control unit 310 permits the user to access the website, as the website is identified as not belonging to the content category.

If no control classifier is stored that matches the website (i.e. if the initial classification of the website is verified by the control classifier), the website is determined to belong to the content category and the access control unit 310 controls access to the website 250 according to user requirements. The access control may be based on the use's previous selection, for example at step 240.

In exemplary methods and apparatus, all of the steps shown in FIG. 2c may be undertaken in a user terminal 100. In other exemplary methods and apparatus, one or more of the steps of FIG. 2c may be undertaken in a server 102.

For example, referring to FIGS. 2c and 4, after the user terminal 100 has visited 244 a website, data relating to the visited website may be transmitted to the server 102. The access control unit 410 of the server 102 may determine 246, based on the received data, whether an initial classifier matches the website, as set out above in respect of the access control unit 310 of the user terminal 100.

If an initial classifier matches the website, the access control unit 410 may then determine 248 whether a control classifier whether a control classifier associated with the same content category as the initial classifier matches the website, as set out above in respect of the access control unit 310 of the user terminal 100.

If a control classifier is stored in the memory 412 of the server 102 that matches the website (i.e. if the initial classification of the website is not verified by the control classifier), the process ends and the access control unit 410 permits the user to access the website, as the website is identified as not belonging to the content category.

If no control classifier is stored that matches the website (i.e. if the initial classification of the website is verified by the control classifier), the website is determined to belong to the content category and the access control unit 410 controls access to the website 250 according to user requirements.

In exemplary methods and apparatus, an expiry date may be set, at which time the process may return to the verification phase of FIG. 2*b*. Alternatively, a threshold for the number of corrections that the user makes to the resulting classified pages during the use stage may be used as an expiry point. Once the threshold is reached, the process may return to the verification phase. The classifiers may thereby be retrained at any time. Also, the user may manually indicate that the classifiers should be retrained. The user can also be asked whether they agree to upload to a server the URLs, labels and/or classifiers that he has generated/determined so that they can be used by other users connected to the network.

The following describes an exemplary scenario for controlling access to websites. In the exemplary scenario, the methods disclosed herein are embodied in an application for execution on a processor of a user terminal. A user would like to avoid anti-Semitic websites. Therefore, the user decides to train the application to recognize anti-Semitic content in websites.

It is emphasised that the scenario is exemplary only and need not limit the scope of the invention. Each feature disclosed in the exemplary scenario or the description above may be incorporated in the invention, whether alone or in any appropriate combination with any other feature disclosed or illustrated herein.

1. The user visits a training website that contains anti-Semitic content. This may be done accidentally, or deliberately in order to train the application.
2. The user accesses a list of content categories stored in memory and checks whether any content category is suitable to categorise anti-Semitic websites.
3. The user finds no predefined labels that could be useful and so generates a custom content category entitled "anti-Semitic" and adds the website to the custom content category.
4. The feature extraction unit 308, 408 extracts content and a URL related to the website. The feature extraction unit 308, 408 may extract one or more the following features:
   a. All the keywords on the page content, which may be in 4-gram format and with all special characters and whitespaces removed;
   b. All the keywords on the page title, which may be in 4-gram format and with all special characters and whitespaces removed;
   c. All the keywords on the URL, which may be in 4-gram format and with all special characters and whitespaces removed;
   d. One or more small, medium and/or large images on the website;
   e. Content categories (based on content categories stored in the memory 312, 412 of another user terminal and/or server) of the hyperlinks (in iframes, anchors, etc.) that this page connects to;
   f. The color of the background page in RGB;
   g. The number and size of flash objects on the page.
5. The feature extraction unit 308, 408 is configured to store in memory 312, 412 (e.g. the local disk) one or more of the above features related to the website.
6. The user then visits further websites comprising anti-Semitic content. When the user completes steps 1-3 again, the feature extraction unit 308, 408 will complete steps 4 and 5. This is continued until a predefined minimum threshold is reached. The threshold may be in the range from 100 to 500 websites, from 200 to 300 websites or, specifically may be 250 websites.
7. When the threshold is reached, the training set is complete. Now all of the features that have been extracted earlier are processed by the classifier determining unit 304, 404. Processing may comprise using features that are found to be represented in a minimum number of training websites as a basis for classifying future visited pages. For example, if a keyword is extracted that relates to anti-Semitic content and that keyword is found in at least a percentage of training websites equal to or greater than a valid feature threshold, that feature may be used to classify if a website accessed in the future belongs to the "anti-Semitic" content category. The valid feature threshold may be in the range from 5% to 50% of training websites, in the range from 5% to 25% of training websites or, specifically, may be 10% of training websites. On the other hand, features that are found in a percentage of training websites equal to or below an invalid feature threshold are discarded. The invalid feature threshold may be in the range from 1% to 10% of training websites, in the range from 1% to 5% of training websites or, specifically, may be 2% of training websites. A classifier is formed comprising one or more valid features.
8. The user is then asked if he wants to enter the verification stage.
9. If the user answers yes then during the verification stage, the user accesses a verification website and it is assessed against the classifier by the verification unit 311, 411. If the verification unit 311, 411 finds a matching classifier, the user is prompted to confirm whether the verification website should be categorized "anti-Semitic".
10. If the user agrees, then a correct counter associated with the classifier is incremented. If the user disagrees, the verification website is then processed and one or more of the features referred to above are also extracted from the verification website by the feature extraction unit 308, 408. The features extracted from the verification website are used as a "non-anti-Semitic" set. That is, the features extracted from the verification website form a control classifier and the final classifier can be said to comprise an initial classifier and a control classifier. The initial classifier comprises the features extracted from the training websites. The control classifier comprises features extracted from the verification websites. The features in the control classifier are juxtaposed against the initial classifier the next time the initial classifier identifies a website in the anti-Semitic content category. The control classifier thereby reduces the chance of the occurrence of the same false positive. If the user disagrees with the classifier's classification, an incorrect counter associated with the classifier is incremented.
11. When the number of matches has reached a threshold value, for example 30, and the ratio of the value of the correct counter to the value of the incorrect counter is greater than a threshold value, for example 80%, the verification unit 308, 408 determines the classifier to be verified. The user is asked whether he wants to enter the usage stage, in which the classifier starts blocking. The user may elect to continue the verification stage, for example, until a greater number of verification websites, for example 60, have been matched.
12. If the user chooses to continue the verification stage, the method returns to step 9. If the user elects to enter the usage stage, the classifier is deployed fully and starts blocking anti-Semitic websites on the client.

FIG. 3 shows a user terminal 100 configured to access websites over a network. The user terminal 100 comprises a communication unit 300 comprising a receiver 301 and a transmitter 302. The user terminal 100 further comprises a classifier determining unit 304, a classification unit 306, a feature extraction unit 308, an access control unit 310, a verification unit 311 and a memory 312. Each of the receiver 300, transmitter 302, classifier determining unit 304, classification unit 306, feature extraction unit 308, access control unit 310, verification unit 311 and memory 312 is in electrical communication with all of the other features 300, 302, 304, 306, 308, 310, 311 312 in the user terminal 100. Further, the receiver 300 and transmitter 302 are in electrical communication with other nodes in the network 104 and are configured to transmit and receive messages to and from those nodes. The user terminal 100 can be implemented as a combination of computer hardware and software. The memory 312 stores the various programs/executable files that are implemented by a processor and also provides a storage unit for any required data. In practice, the functions of the classifier determining unit 304, classification unit 306, feature extraction unit 308, access control unit 310 and verification unit 311 may be provided by one or more processors configured to undertake the method steps disclosed herein.

FIG. 4 shows a user server 102 configured to access websites over a network. The server 102 comprises a communication unit 400 comprising a receiver 401 and a transmitter 402. The server 102 further comprises a classifier determining unit 404, a feature extraction unit 408, an access control unit 410, a verification unit 411, a memory 412 and a classifier comparison unit 414. Each of the receiver 400, transmitter 402, classifier determining unit 404, feature extraction unit 408, access control unit 410, verification unit 411, memory 412 and classifier comparison unit 414 is in electrical communication with all of the other features 400, 402, 404, 406, 408, 410, 411, 412, 414 in the sever 102. Further, the receiver 400 and transmitter 402 are in electrical communication with other nodes in the network 104 and are configured to transmit and receive messages to and from those nodes. The server 102 can be implemented as a combination of computer hardware and software. The memory 412 stores the various programs/executable files that are implemented by a processor and also provides a storage unit for any required data. In practice, the functions of the classifier determining unit 404, feature extraction unit 408, access control unit 410, verification unit 411 and classifier comparison unit 414 may be provided by one or more processors configured to undertake the method steps disclosed herein.

Individual users, such as parents and employers have different requirements. Additionally, they may be located in different jurisdictions in which different legal constraints apply, for example freedom of speech can be considered as a right in one territory, but be more restricted in another. Supporting content categorisation for a wide variety of users with generic network security applications is very difficult. Exemplary methods and apparatus disclosed herein provide a method of training a user terminal 100 and/or a server 102 to control access to websites based on user preferences. In this way, network security applications are able to provide support to users having different biases, religious affiliations and sensibilities. Some users don't want their children to view a certain type of content, but current parental control applications do not support identification of a particular type of content. Predefined strict definitions of categories to adhere to can be problematic, as what users want to categorise may not necessarily be a subset of the provided defined categories.

Additionally, methods and apparatus disclosed allow the user to customise network security applications themselves, removing the need for this to be done by the application provider. Adding new categories to existing applications and hunting for the actual websites to reflect them in backend processing is time-consuming, tedious and costly for the application provider. Also, a user may no longer have the need to communicate with the application provider for support in a particular category since they can create their own labels, as the need arises.

When the user classifies websites and web content, this may be sent to the application provider that can cross-check the content with classifications provided by other users. The information may therefore be used in a crowdsourcing fashion. Giving users an open-ended solution enables an application provider to learn more about what the user's needs are.

In exemplary methods and apparatus, individual users may generate their own "local" classifiers based on the features extracted from the training sets that they have compiled. This may be done in any of the ways discussed above. If a user terminal 100 has determined and stored a classifier, as set out above, it may be configured to transmit that classifier to a server 102. In other exemplary methods and apparatus, the server 102 may be configured to determine and store a classifier, as set out above.

In many cases, the opinion of several users on which websites should have controlled access will be common. That is, several users may all consider that a category of content of a website is unwanted content and so should be associated with a classifier. The several users may be in the same geolocation or may even be globally distributed in some cases. As such, if a plurality of people in the same area (or even globally) build one or more classifiers for a particular type of content, this may be noticed by the server and utilised to strengthen a particular classifier.

The server 102 may be configured to determine whether a plurality of classifiers generated by a plurality of users correspond to the same or a similar content category. If that is determined, the server 102 may be configured to collect all the training sets generated associated with the classifiers and produced during the generation of the classifiers. This results in a single large training set that can be used to produce a single classifier using information gathered by a plurality of users. The training set may also include websites that have already been classified by a corresponding user terminal 100 or the server 102 using one of the plurality of classifiers. That is, the training may include websites classified in the usage phase. Therefore, a new training set is generated and a new classifier, which contains every client's input can be determined. This new classifier now has better coverage than the classifier of an individual user and would serve each user better.

In addition, when another user terminal attempts to generate the same type of classifier for himself, server can simply recommend the already available bigger classifier and ask if they would like to test that instead. In this way, the user may not have to build new training sets to generate a new classifier from scratch and/or may contribute to the larger classifier.

Figure 5:
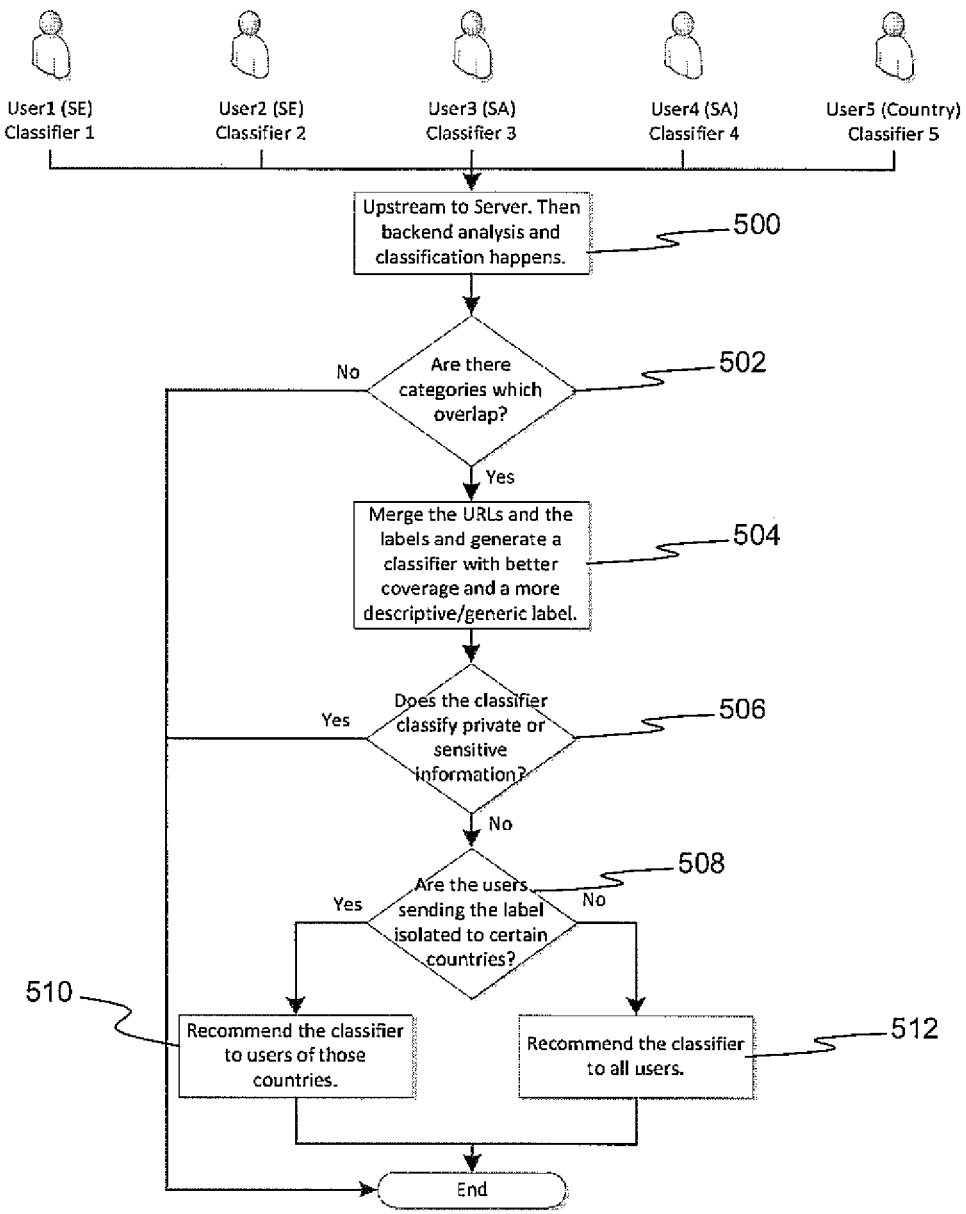
FIG. 5 shows a flow diagram of a method of determining a classifier.

Referring to FIG. 5, a plurality of users, Users 1-5, determine corresponding classifiers, Classifiers 1-5. Classifiers 1-5 may be determined at the user terminal 102 of a corresponding user or by the server 102 as discussed above.

If the Classifiers 1-5 are determined by the server 102, they are stored in the memory 412. In the exemplary method shown in FIG. 5, Classifiers 1-5 are uploaded 500 to the server 102.

The classifier comparison unit 414 is configured to compare 502 a plurality of classifiers stored in the memory 412 to determine whether any of them overlap. If none of the Classifiers 1-5 overlaps, the process ends. If a plurality of Classifiers 1-5 overlap in terms of their content categories, the feature extraction unit 408 may be configured to extract a plurality of the websites from each training set associated with the overlapping classifiers. For example, if Classifiers 1, 2 and 4 overlap, the feature extraction unit 408 may retrieve from memory 412 the training websites used to generate each of those classifiers.

The classifier determining unit 404 merges the retrieved training websites into a single global training set and uses that global training set to generate 504 a global classifier. The term "global" is used in this context to mean that the merged training set and resulting classifier is generated based on a plurality of individual classifiers.

The global classifier may be determined using the methods set out above using the global training set. The global classifier may then be recommended to other users wishing to control access to the same or similar content. For example, the classifier comparison unit 414 may be configured to monitor training websites used by further users to generate a classifier. If the monitored training websites overlap with the global classifier, the classifier determining unit 404 may transmit a notification to the user terminal 102 of the further user recommending the global classifier.

In exemplary methods and apparatus, the classifier determining unit 404 may determine 506 whether the global classifier relates to private or sensitive information. If the global classifier does relate to such information, the process ends and the global classifier is not recommended to any further users. If the global classifier does not relate to private or sensitive information, the classifier determining unit 404 determines 508 whether the global classifier should be restricted to use in particular countries or regions. This determination may be based, for example, on the content category and/or on the plurality users that determined the plurality of classifiers used in the determination of the global classifier. Based on the decision at step 508, the classifier determining unit 404 may recommend the global classifier only to users in a particular country or region 510 or may recommend the global classifier to all users 512.

There will be occasions when the server 102 has training sets of a particular content category stored in the memory 412 and that a first user terminal wishes to block, but the server 102 has not yet determined a first classifier for that content category, as it is still in a training phase or a validation phase. In such cases, a second user terminal may already have the need for blocking that type of content and the server 102 can work together with that user terminal.

Figure 6:
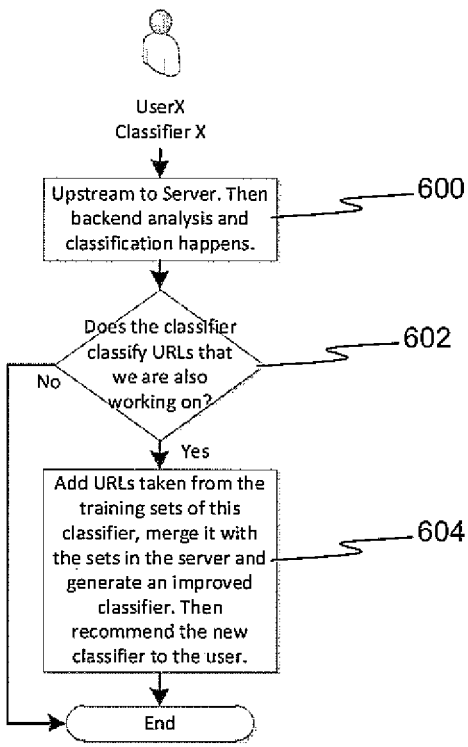
FIG. 6 shows a flow diagram of a method of determining a classifier.

Referring to FIG. 6, the second user terminal, User X, generates a second classifier, Classifier X, using any method set out herein. Information relating to Classifier X, including training websites, is stored in the memory 412 of the server 102. The information may be stored in the memory 412 as part of the process of determining Classifier X, if it is determined in the server 102. Alternatively and as in the exemplary method of FIG. 6, the information may be transmitted 600 to the server 102 after Classifier X has been determined at the user terminal.

Classifier X may then be used in the server by the access control unit 410 to control access to websites by the second user's user terminal. The classifier comparison unit 414 may monitor websites that match Classifier X and determine 602 whether any of those websites are also included in a training set of the first classifier that is in the process of being generated. If there is a match, the classifier comparison unit 414 may then retrieve from memory 412 one or more training websites associated with Classifier X. The classifier comparison unit 414 may retrieve from the memory 412 the complete set of training websites associated with the Classifier X.

The classifier determining unit may merge the retrieved training websites with those associated with the first classifier and generate 604 a new global classifier using the merged training set. The global classifier may be recommended to the first user terminal and/or the second user terminal.

In exemplary methods and apparatus, the websites matched to Classifier X might not be identical to those in the training set of the first classifier but may be similar. The similarity may be determined by extracting from a matched website features such as those discussed above and assessing the extracted features against similar features of the websites in the training set associated with the first classifier. In cases where the similarity is not easily determined, there could also be human verification for final judgment.

In exemplary methods and apparatus, a server 102 may have a plurality of classifiers stored thereon. Any number of those classifiers may be in use in the server 102 but may not have been deployed to the user terminal 100 for whatever reason. In this scenario, the classifiers in use on the server 102 may be, for example, classifying content in the backend and generating categorizations.

Figure 7:
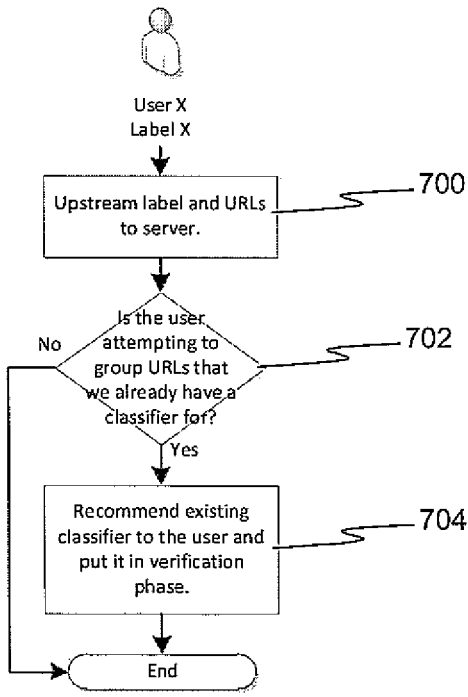
FIG. 7 shows a flow diagram of a method of recommending a classifier to a user terminal.

Referring to FIG. 7, a user terminal 100 adds one or more training websites to a training set for a classifier. The training websites are transmitted 700 to the server 102. The received training websites and the corresponding content are processed 702 by the access control unit 410 under the classifiers that the server has stored to determine whether there is a match. If one or more of the training websites in the training set matches a classifier stored on the server 102, the classifier determining unit 410 may recommend 704 that classifier to the user terminal 102 instead of the user terminal continuing with the process of generating the training set and determining an individual classifier. If the user accepts, the classifier enters the verification phase on the user's side.

The methods and apparatus disclosed require some form of engagement from the user, but only up to a certain extent and a reduced level compared to crowdsourcing. When the system has learnt everything that it needs from the user and the user has verified that the system classifies correctly, then user engagement is no longer necessary. In some exemplary methods and apparatus, the system may update the classifiers by asking for more user input at, for example, predetermined times.

Instead of merely crowdsourcing ratings, the methods and apparatus disclosed enable users to protect themselves through classifying content that they want to pinpoint and effectively avoid. The ability to label the websites themselves and use them as training sets, then verify if the product is already able to identify the same content on its own gives the user the ability to tweak application capabilities according to their needs. Today's users like a customized experience, and the methods and apparatus disclosed can offer them that without having too much of an overhead at the application provider end.

Having this functionality only requires the user to be engaged when they want to. The more engaged they are, the more accurate the results they get, therefore their stake on keeping the bar high can be felt.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Each feature disclosed or illustrated in the present specification may be incorporated in the invention, whether alone or in any appropriate combination with any other feature disclosed or illustrated herein.

The skilled person will be able to envisage other embodiments without departing from the scope of the appended claims.

The invention claimed is:

1. A method of website access control, comprising:
   accessing, by a communications unit of a user terminal, a plurality of training websites over a network;
   classifying, by a classification unit of the user terminal, the training websites in a content category based on a user input;
   extracting, by a feature extraction unit, one or more features indicative of the content category from the training websites; determining, by a classifier determining unit, a classifier for classifying websites in the content category based on the extracted features;
   verifying, by a verification unit, the determined classifier by accessing, by the communications unit of the user terminal, a plurality of verification websites and classifying the verification websites using the classifier and if the verification websites are classified in the content category, prompting a user to verify the classification of the verification websites; and
   classifying, by an access control unit, further requested websites using the verified determined classifier and controlling access to the further requested websites based on the classification of the websites, wherein the feature extraction unit, the classifier determining unit and the verification unit form part of the user terminal, the method further comprising:
   transmitting the verified determined classifier to a server and storing the classifier and a corresponding set of training websites in a memory of the server as part of a plurality of classifiers and a plurality of associated sets of training websites;
   comparing, by a classifier comparison unit, the plurality of classifiers to determine whether the content categories of each overlap;
   if the content categories of the plurality of classifiers overlap, extracting, by the feature extraction unit, a plurality of training websites from each of the sets of training websites corresponding to the overlapping classifiers;
   merging, by the classifier determining unit, the extracted plurality of training websites into a global set of training websites; and
   determining, by the classifier determining unit, a global classifier based on the global set of training websites.

2. A method according to claim 1, wherein controlling access to the further requested websites comprises denying access if the classifier classifies the website in the content category.

3. A method according to claim 1, further comprising, if the user does not verify the classification of the verification websites, extracting features indicative of the content category from the verification website and updating the classifier based on the extracted features.

4. A method according to claim 3, wherein the classifier comprises an initial classifier and a control classifier, the initial classifier being determined based on the features extracted from the training websites, and the control classifier being determined based on the features extracted from the verification websites, wherein updating the classifier comprises determining the control classifier based on the features extracted from the verification websites.

5. A method according to claim 4, wherein, the verification websites are classified using the initial classifier and, if the initial classifier classifies the verification website in the content category, the classification is checked using the control classifier, the user being prompted if the initial classifier and the control classifier classify the verification website in the content category.

6. A method according to claim 4, wherein controlling access to a website comprises:
classifying the website using the initial classifier;
if the initial classifier classifies the further website in the content category, checking the classification using the control classifier; and controlling access to the website if the initial classifier and the control classifier classify the website in the content category.

7. A method according to claim 1, further comprising, if the user verifies the classification, incrementing a correct counter and, if the user does not verify the classification, incrementing an incorrect counter.

8. A method according to claim 7, further comprising verifying the classifier if the ratio of correct classifications to incorrect classifications reaches a threshold value.

9. A method according to claim 1, further comprising at least one of repeating the verification at a predetermined time; and repeating the verification based on a user input.

10. A method according to claim 1, wherein determining the classifier comprises selecting features present in a number of the plurality of training websites greater than or equal to a valid feature threshold and including the selected features in the classifier.

11. A method according to claim 1, wherein the feature extraction unit, the classifier determining unit and the verification unit form part of the server, the method further comprising storing the classifier and a corresponding set of training websites in a memory of the server.

12. A method according to claim 1, further comprising transmitting, by the communications unit a notification generated by the classifier determining unit recommending the global classifier to one or more user terminals using one or more of the plurality of classifiers.

13. A method according to claim 1, wherein the access control unit forms part of the server, the method further comprising:
comparing, by a classifier comparison unit, a further website classified based on the determined classifier with a plurality of training websites corresponding to an undetermined classifier;
if the further website matches one of the plurality of training websites for the undetermined classifier, retrieving, by the classifier comparison unit, one or more training websites corresponding to the determined classifier;
merging, by the classifier determining unit, the retrieved one or more training websites corresponding to the determined classifier and the training websites corresponding to the undetermined classifier into a global set of training websites; and
determining, by the classifier determining unit, a global classifier based on the global set of training websites.

14. A method according to claim 1, wherein the access control unit forms part of the server, the method further comprising, at the server:
receiving, by the communications unit, data from a further user terminal relating to one or more training websites corresponding to an undetermined classifier;
classifying, by the access control unit, the one or more training websites corresponding to the undetermined classifier based on the determined classifier;
if the one or more training websites corresponding to the undetermined classifier is classified in the content category of the determined classifier, transmitting, by the communications unit a notification generated by the classifier determining unit recommending the global classifier to the further user terminal.

15. A non-transitory computer readable medium comprising computer readable code configured to carry out a method of website access control, the method comprising:
accessing, by a communications unit of a user terminal, a plurality of training websites over a network; classifying, by a classification unit of the user terminal, the training websites in a content category based on a user input; extracting, by a feature extraction unit, one or more features indicative of the content category from the training websites;
determining, by a classifier determining unit, a classifier for classifying websites in the content category based on the extracted features;
verifying, by a verification unit, the determined classifier by accessing, by the communications unit of the user terminal, a plurality of verification websites and classifying the verification websites using the classifier and if the verification websites are classified in the content category, prompting a user to verify the classification of the verification websites; and
classifying, by an access control unit, further requested websites using the verified determined classifier and controlling access to the further requested websites based on the classification of the websites, wherein the feature extraction unit, the classifier determining unit and the verification unit form part of the user terminal, the method further comprising:
transmitting the verified determined classifier to a server and storing the classifier and a corresponding set of training websites in a memory of the server as part of a plurality of classifiers and a plurality of associated sets of training websites;
comparing, by a classifier comparison unit, the plurality of classifiers to determine whether the content categories of each overlap;
if the content categories of the plurality of classifiers overlap, extracting, by the feature extraction unit, a plurality of training websites from each of the sets of training websites corresponding to the overlapping classifiers;
merging, by the classifier determining unit, the extracted plurality of training websites into a global set of training websites; and
determining, by the classifier determining unit, a global classifier based on the global set of training websites.

16. A user terminal for controlling access to a website, the user terminal comprising:

a communication unit configured to access a plurality of training websites over the network; a classification unit configured to train the user terminal by classifying the training websites in a content category based on a user input;

a feature extraction unit configured to extract from the training websites one or more features indicative of the content category; a classifier determining unit configured to determine a classifier for classifying websites in the content category based on the extracted features; wherein the communication unit is further configured to access a plurality of verification websites and a verification unit is configured to verify the determined classifier by classifying the verification websites using the classifier and if the verification websites are classified in the content category, prompting a user to verify the classification of the verification websites; and an access control unit configured to classify further requested websites using the verified determined classifier and to control access to the further requested websites based on a classification of the websites, wherein the feature extraction unit, the classifier determining unit and the verification unit form part of the user terminal, further comprising:

transmitting the verified determined classifier to a server and storing the classifier and a corresponding set of training websites in a memory of the server as part of a plurality of classifiers and a plurality of associated sets of training websites;

comparing, by a classifier comparison unit, the plurality of classifiers to determine whether the content categories of each overlap;

if the content categories of the plurality of classifiers overlap, extracting, by the feature extraction unit, a plurality of training websites from each of the sets of training websites corresponding to the overlapping classifiers;

merging, by the classifier determining unit, the extracted plurality of training websites into a global set of training websites; and determining, by the classifier determining unit, a global classifier based on the global set of training websites.

17. A server for controlling access to a website, the server comprising:

a communication unit configured to receive data relating to a plurality of training websites over the network;

a feature extraction unit configured to extract from the training websites one or more features indicative of the content category;

a classifier determining unit configured to determine a classifier for classifying websites in the content category based on the extracted features;

wherein the communication unit is further configured to receive data relating to a plurality of verification websites and a verification unit is configured to verify the determined classifier by classifying the verification websites using the classifier and if the verification websites are classified in the content category, prompting a user of a user equipment to verify the classification of the verification websites; and an access control unit configured to classify further requested websites using the verified determined classifier and to control access to the further requested websites based on a classification of the websites, wherein the feature extraction unit, the classifier determining unit and the verification unit form part of the server, further comprising:

storing the classifier and a corresponding set of training websites in a memory of the server as part of a plurality of classifiers and a plurality of associated sets of training websites;

comparing, by a classifier comparison unit, the plurality of classifiers to determine whether the content categories of each overlap;

if the content categories of the plurality of classifiers overlap, extracting, by the feature extraction unit, a plurality of training websites from each of the sets of training websites corresponding to the overlapping classifiers;

merging, by the classifier determining unit, the extracted plurality of training websites into a global set of training websites; and determining, by the classifier determining unit, a global classifier based on the global set of training websites.

* * * * *